United States Patent Office 3,272,865
Patented Sept. 13, 1966

3,272,865
PREPARATION OF AMINATED BENZENES FROM HYDROXY BENZENES
Robert S. Barker, Port Washington, N.Y., assignor to Halcon International, Inc., a corporation of Delaware
No Drawing. Filed Aug. 10, 1962, Ser. No. 216,063
6 Claims. (Cl. 260—581)

This invention relates to the preparation of aminated benzenes from hydroxy benzenes. More specifically, the instant invention relates to the preparation of aniline from phenol by the catalytic amination of the latter.

Aniline is a commercial chemical of great industrial importance. Its uses are varied including application as a rubber accelerator, antioxidant, dye, dye intermediate, drug intermediates, explosive and fuel. Conventionally, aniline is prepared by the reduction of nitrobenzene with iron filings or borings and 30% hydrochloric acid; reaction of chlorobenzene with aqueous ammonium at 200° C. and 800 p.s.i., and by catalytic vapor phase reduction of nitrobenzene with hydrogen.

Prior attempts to form aniline from phenol by treating the latter with ammonia over alumina met with only moderate success. Generally, even at high temperatures the degree of conversion obtained was inadequate, and the temperature required caused losses of the organic substances, and excessive catalyst fouling. As a result, the process was of limited commercial significance.

In accordance with this invention, it has been found that high yields of animated benzenes can be obtained from hydroxybenzenes by catalytic exchange of the hydroxy radical for the amino radical in the presence of ammonia (henceforth referred to herein as a "catalytic amination").

The type of catalyst employed has been found to be of particular significance. Among the catalysts which are within the scope of the instant invention are silica-alumina, titania-alumina, zirconia-alumina, phosphoric acid and tungsten oxide. Particularly preferred are the silica-alumina acid form zeolites, either natural or synthetic, e.g. molecular sieves. Most outstanding results are obtained with silica-alumina catalysts wherein either the silica or the alumina constitutes from 10 to 20% by weight of the catalyst. These catalysts are more strongly acidic than catalysts outside of these compositions and are more effective for the purposes of the instant invention.

The reaction temperatures which are employed herein broadly range from 300 to 600° C., preferably 350 to 500° C. and most desirably, 400 to 480° C. A broad range of pressures may be employed, preferably superatmospheric and most desirably pressures in excess of 7 atmospheres.

While in its preferred embodiment the invention is concerned with the preparation of aniline, it is understood that other related compounds may be prepared by the selection of the other starting materials. "Hydroxybenzenes" as used herein are defined as phenol and substituted derivatives, where one or more ring hydrogen is replaced by an aliphatic, aromatic group or both, preferably the substituted group contains from 1 to 6 carbon atoms per molecule and less than three ring hydrogens are replaced by such hydrocarbon groups. Substituted phenol include the cresols, xylenols, pseudocumenol, mesitol, ethylphenol, propylphenol, cumenol, butylphenol, cyclohexylphenol, and phenylphenol.

The "aminating agent" employed in accordance with the instant invention is ammonia. However, other compounds which yield ammonia may be used as ammonium chloride, ammonium carbonate and the like. Also useful as other aminating agents are the hydrocarbon substituted primary and secondary amines, such as methylamine, and N-methylaniline. Preferably the hydrocarbon radical contains from 1 to 10 carbon atoms. The following table will aid in an understanding of how the products obtained vary with changes in the starting material.

TABLE

| | Hydroxybenzene | Aminating Agent | Aminated Benzene |
|---|---|---|---|
| 1 | Phenol | Ammonia | Aniline. |
| 2 | Cresol | do | Toluidine. |
| 3 | Phenol | Methylamine | N-methylaniline. |
| 4 | Cresol | do | N-methyltoluidine. |
| 5 | Cuminol | Aniline | N-phenylaminoisopropylbenzene. |

The range of concentration of the aminating agent in relation to the hydroxybenzene may be broadly, from ½ to 40 moles of aminating agent per mole of hydroxybenzene, preferably the aminating agent concentration is from 1 mole to 20 moles per mole of hydroxy compound.

In the catalytic reactions set forth herein, it is necessary to periodically regenerate the catalyst, because of the deposit of carbonaceous material thereon. Regeneration has proven difficult and time consuming. In accordance with another embodiment of the instant invention it has been found that regeneration can be greatly facilitated by incorporating known oxidation-type metals and metal oxides, such as, cerium, vanadium or tungsten or their salts or oxides into or upon the catalyst. For a more exhaustive list of the applicable elements see groups 5B, 6B and 7B of the periodic chart.

The incorporation of such materials permits the more rapid and complete regeneration of the catalyst. This regeneration may be accomplished at the reaction conditions by contacting the catalyst with an oxygen containing stream. Preferably, from 1 to 25% oxygen is present. The regeneration serves to remove any carbonaceous deposits which have accumulated on the catalyst during the amination. The regeneration procedure requires the use of 1 to 100 parts of oxygen per part of catalyst, preferably from 2 to 50. The flow rate of the oxygen containing gas should be from 1 to 100 lbs./hr./lb. of catalyst. The failure to coat the catalyst with the materials recited above results in slow and incomplete regeneration of the catalyst.

The catalyst may be coated with the metal by any known technique: spraying, dipping, or incorporation in original mix prior to forming. The finished catalyst should contain from 0.1 to 25 parts of metal by weight per 100 parts of catalyst, preferably from 0.5 to 5.

To more fully illustrate the instant invention attention is directed to the following examples:

*Example 1*

A commercial silica-alumina-catalyst comprising 15% alumina and 85% silica is placed in a three foot reactor.

Phenol and ammonia, in a molar ratio of 1 to 15, are passed over the catalyst 200 p.s.i.g. and 425° C. The effluent from the reactor contains 88.6% aniline and 1.8% phenol. After 40 hours the catalyst shows a loss of activity which is evidenced by the decreasing amount of aniline, and the increasing amount of phenol in the effluent. An examination of the catalyst shows that a carbonaceous coating forms thereon.

*Example 2*

The titania-alumina catalyst is substituted for the catalyst of Example 1. Under the same reaction conditions essentially similar yields of aniline result.

*Example 3*

A commercial gamma-alumina catalyst is substituted for the silica-alumina of Example 1. Under the same conditions as Example 1, the reaction proceeds very slowly as is evidenced by the low formation of aniline. At a temperature of 475° C., 45% of the phenol is converted to aniline. This example clearly shows that a gamma-alumina catalyst gives inferior conversions to phenol as compared to the catalysts of the instant invention. This is true despite the fact that higher temperature conditions are employed.

*Example 4*

A fresh catalyst, having the same composition as in Example 1, is coated with 10 parts of cerium nitrate per hundred parts of catalyst. The coated catalyst is placed in a reactor and contacted with phenol and ammonia under the same conditions as described in Example 1. After 60 hours of operation, when activity decreases, feed is stopped and the reactor purged with nitrogen. A 4% oxygen and nitrogen mixture is passed over the catalyst for 4 hours. The reactor is again purged with nitrogen and the phenol and ammonia again introduced. The yield of aniline from the regenerated catalyst is essentially the same as set forth in Example 1. This clearly shows that the catalyst when coated with a metal in accordance with the invention may be readily regenerated.

*Example 5*

A 2% $V_2O_5$ coating is placed on a silica-alumina catalyst having the composition described in Example 1 by spraying ammonium vanadate solution on the catalyst, drying at 100° C., and then heating at the reaction temperature in the presence of nitrogen for four hours. The production of aniline is essentially the same as that described in Example 1. The catalyst is regenerated with 4% oxygen and nitrogen at 450° C. after 80 hours. After regeneration a mixture of phenol and ammonia in a ratio of 1 to 7 is passed over the catalyst. The other conditions are the same as described in Example 1. An analysis of the effluent, after water removal, shows a composition of 85% aniline, 2% phenol, 9% diphenylamine and 1% carbazole. Substantially similar yields are obtained after 40 hours of operation.

*Example 6*

Using the catalyst and conditions shown in Example 1, the reaction is continued until signs of decreased activity, due to carbonization occur, i.e., after 60 hours. After the reaction is stopped the gas phase is displaced with nitrogen, and the catalyst purged with 4% oxygen and nitrogen for four hours at 450° C. At the end of this period no more $CO_2$ appears in the vent gas. The catalyst, upon contact with additional phenol and ammonia is active for only a comparatively short period of time, i.e. for about 24 hours. This should be compared to the results obtained with the metal coated catalyst employed in Examples 4 and 5. In these latter examples regeneration is complete and necessary only after 40 to 80 hours.

*Example 7*

Meta-cresol is treated in a manner similar to that shown for phenol in Example 1. A 95% yield of m-toluidine is obtained.

*Example 8*

Para-cresol is passed over a zirconia-silica catalyst at 425° C. under the same conditions shown in Example 1. A yield of 92% p-toluidine is obtained.

*Example 9*

Example 1 is repeated except that the temperature is maintained at 350° C. The yield of aniline is less than 25%.

It will be understood that modifications and variations may be affected without departing from the spirit of the invention.

I claim:

1. A process for the preparation of an aminated benzene which comprises: contacting an aminating agent selected from the group consisting of ammonia, ammonium chloride, ammonium carbonate, methylamine, aniline, N-methyl aniline, and an hydroxybenzene selected from the group consisting of phenol and derivatives thereof having from 1 to 3 ring hydrogens replaced by a radical selected from the group consisting of aromatic and aliphatic hydrocarbon radicals having from 1 to 6 carbon atoms in the presence of a catalyst selected from the group consisting of silica-alumina having from 10 to 20% silica, silica-alumina having from 10 to 20% alumina, zirconia-alumina, titania-alumina, phosphoric acid and tungsten oxide, at a temperature between 300 and 600° C. and pressures in excess of 7 atmospheres; and withdrawing a stream containing an aminated benzene.

2. The process of claim 1 wherein said hydroxybenzene is phenol and said aminated benzene is aniline.

3. The process of claim 1 wherein said aminated agent is ammonia.

4. The process of claim 1 wherein said catalyst contains a metal selected from groups by 5B, 6B and 7B of the periodic chart.

5. The process of claim 1 wherein the temperature is from 400 to 480° C.

6. A continuous process for the preparation of aniline which comprises: introducing ammonia and phenol in a molar ratio between ½:1 to 40:1 into a reaction zone containing a silica-alumina catalyst having from 10 to 20% of one of said compounds and containing a metal selected from groups consisting of 5B, 6B, and 7B in the periodic chart; reacting said phenol and ammonia; withdrawing the reaction product containing aniline; discontinuing the introduction of said phenol and ammonia after from 40 to 80 hours; introducing a gas containing from 1 to 25% oxygen into said zone at a rate of from 1 to 100 lbs. per hour per pound catalyst at a temperature of from 300° to 600° C., thereby regenerating the catalyst; resuming the introduction of ammonia and phenol and cyclicly continuing said process.

References Cited by the Examiner

UNITED STATES PATENTS

| | | | |
|---|---|---|---|
| 1,449,423 | 3/1923 | Lowy et al. | 260—581 |
| 1,475,502 | 11/1923 | Manning | 252—411 |
| 1,935,209 | 11/1933 | Herold et al. | 260—581 |
| 2,113,241 | 4/1938 | Punnett | 260—577 |
| 2,226,635 | 12/1940 | Oxley | 260—581 |
| 2,389,500 | 11/1945 | Goshorn | 260—585 |

CHARLES B. PARKER, *Primary Examiner.*

DALE R. MAHANAND, *Assistant Examiner.*